(12) United States Patent
Zhang et al.

(10) Patent No.: US 12,079,804 B2
(45) Date of Patent: Sep. 3, 2024

(54) TRANSACTION ASSIGNMENT METHOD AND APPARATUS BASED ON STRUCTURED DIRECTED ACYCLIC GRAPH

(71) Applicant: Jiheng Zhang, Hong Kong (CN)

(72) Inventors: Jiheng Zhang, Hong Kong (CN); Jiahao He, Hong Kong (CN); Guangju Wang, Hong Kong (CN); Guangyuan Zhang, Hong Kong (CN)

(73) Assignee: Jiheng Zhang, Hong Kong (CN)

( * ) Notice: Subject to any disclaimer, the term of this patent is extended or adjusted under 35 U.S.C. 154(b) by 729 days.

(21) Appl. No.: 17/420,683

(22) PCT Filed: Jan. 8, 2019

(86) PCT No.: PCT/CN2019/070887
§ 371 (c)(1),
(2) Date: Jul. 5, 2021

(87) PCT Pub. No.: WO2020/142906
PCT Pub. Date: Jul. 16, 2020

(65) Prior Publication Data
US 2022/0101318 A1 Mar. 31, 2022

(51) Int. Cl.
*G06Q 20/38* (2012.01)
*G06F 9/50* (2006.01)
(Continued)

(52) U.S. Cl.
CPC ......... *G06Q 20/38215* (2013.01); *G06F 9/50* (2013.01); *G06F 16/00* (2019.01);
(Continued)

(58) Field of Classification Search
CPC .............................................. G06Q 20/38215
See application file for complete search history.

(56) References Cited

U.S. PATENT DOCUMENTS

| 2007/0208693 | A1* | 9/2007 | Chang et al. ........... G06F 17/30 |
| 2014/0122510 | A1 | 5/2014 | Namkoong et al. |
| 2017/0212781 | A1* | 7/2017 | Dillenberger et al. . G06F 9/466 |

FOREIGN PATENT DOCUMENTS

| CN | 106897351 A | 6/2017 |
| CN | 109102296 A | 12/2018 |

OTHER PUBLICATIONS

International Search Report and Written Opinion of corresponding PCT Application No. PCT/CN2019/070887 mailed on Oct. 9, 2019.

* cited by examiner

*Primary Examiner* — James J Debrow
(74) *Attorney, Agent, or Firm* — Idea Intellectual Limited; Margaret A. Burke; Sam T. Yip

(57) ABSTRACT

Transaction assignment method and apparatus based on a structured directed acyclic graph (DAG) executed by node devices in a peer-to-peer network are provided including: obtaining data structure of a local database; calculating relative hashing power of each node device by connection information between blocks in the structured DAG; partitioning transactions in the local transaction pool according to the relative hashing power of each node device; based on partitioning result, selecting a first transaction, creating a first new block, establishing connection(s) between the first new block and other blocks in the structured DAG, and removing the first transaction from the local transaction pool; broadcasting the first new block to other node devices in the peer-to-peer network. The invention effectively eliminates waste of hashing power caused by processing transactions with high fees by multiple nodes and increases the chance of processing transactions with low or no fees without sacrificing security and decentralization.

13 Claims, 2 Drawing Sheets

(51) Int. Cl.
*G06F 16/00* (2019.01)
*G06N 7/01* (2023.01)
*H04L 67/104* (2022.01)
*H04L 67/1097* (2022.01)

(52) U.S. Cl.
CPC ........... *G06N 7/01* (2023.01); *G06Q 20/3827* (2013.01); *G06Q 20/3829* (2013.01); *H04L 67/104* (2013.01); *H04L 67/1097* (2013.01)

TRANSACTION ASSIGNMENT METHOD AND APPARATUS BASED ON STRUCTURED DIRECTED ACYCLIC GRAPH

CROSS-REFERENCE TO RELATED APPLICATIONS

This application is a 371 application of International Patent Application under the Application Number PCT/CN2019/070887 filed Jan. 8, 2019, and the disclosure of which is incorporated herein by reference in its entirety.

FIELD OF THE INVENTION

The present application relates to the field of computer network technology, and more particularly, to a transaction assignment method and apparatus based on structured directed acyclic graph (DAG).

BACKGROUND

Blockchain technology is essentially a consensus mechanism design, which is based on a chain structure of storing information in a distributed manner over a peer-to-peer network. Taking Bitcoin as an example, multiple transactions are grouped together and stored in a block that is less than 1 megabyte in size, and all blocks are connected in a chain structure. Although this may not be the most efficient way of storing information, with the help of cryptographic tools like hash functions, public keys and private keys for integrity check and authentication, "Nakamoto consensus" proposed on the basis of the chain structure is able to achieve both security and decentralization. Blockchain technology has achieved great success as exemplified by the emergence and development of Bitcoin and Ethereum. They have proved that a decentralized and secure public ledger system is not only possible, but also has a great impact on our financial system and gives rise to a whole new ecosystem with extendable services and applications.

In the existing Bitcoin scheme, the problem as to who has the right to create blocks is resolved by requesting all participants to compete in solving cryptographic puzzles by tuning a nonce so that the hash result exhibits certain required patterns known as proof of work (PoW). However, the above-mentioned cryptographic puzzles are so difficult that, within a given period of time which is long enough to broadcast a block of a given size over the network, there is possibly only one miner who can form such a block. If other miners who are creating subsequent block(s) disagree with the information in the existing block, they can simply fork from the position preceding that block. Based on the Honest Majority Assumption, all honest miners will eventually be able to collectively agree upon a chain of valid blocks, whereas blocks on the forks are invalid. Therefore, all blocks ever created form a tree. The longest chain in the tree, referred to as Nakamoto chain, is collectively created by all honest miners using PoW. A rigorous formulation of consensus, together with a probabilistic model that formally proves it, has been proposed.

With its growing acceptance, blockchain technology is encountering a serious bottleneck, which is an extremely limited capacity, i.e., a small number of transactions per second (TPS). Eliminating this bottleneck will be a significant breakthrough in advancing the blockchain technology, and will widen its application range. However, security and decentralization should not be compromised when scaling up the capacity.

With respect to the afore-mentioned drawbacks in the chain structure, what can be attempted to overcome the same is to increase the block size, equivalently decrease the time interval between blocks, or use both of them to increase the TPS. However, since larger blocks require longer time to be broadcasted over a peer-to-peer network, such an attempt would increase the chance of forming forked blocks, even in the absence of malicious miners. Therefore, it is necessary to explore other solutions beyond the chain structure so as to increase the capacity by an order of magnitude. Accordingly, it leads to an idea of expanding the chain of blocks to a directed acyclic graph (DAG) of blocks. In another existing method of creating blocks, every participant has a right to form a small block without PoW. Validity of a block is justified by subsequent blocks intended to be appended thereto either directly or indirectly. However, this method is vulnerable to splitting attack and requires performing a computationally expensive task called "updating weights" to calculate the number of blocks appended to each block. In addition, capacity is not the only issue in the current blockchain systems. With an increasing hashing power, cryptographic puzzles become more difficult. From the mathematical point of view, miners with certain hashing power can secure a certain number of blocks in return for rewards. However, huge fluctuations force the majority of miners to join mining pools in order to stabilize their income, leading to concentration of hashing power within a few big mining pools. Another issue is the high latency since it takes a long time to confirm a transaction. In addition, from the consideration of self-interest, miners would try to pack transactions with high fees into their blocks to maximize their reward. Thus, transactions with high fees may easily be processed by multiple nodes, which inevitably leads to a waste of hashing power. Accordingly, there is substantially no chance to process transactions with low or no fees.

SUMMARY OF THE INVENTION

The present application provides a transaction assignment method and apparatus based on structured directed acyclic graph (DAG), which is used to resolve the technical issues of the prior arts, i.e. there is substantially no chance to process transactions with low or no fees; and transactions with high fees are processed by multiple nodes, leading to a waste of hashing power A first aspect of the present invention provides a transaction assignment method based on structured directed acyclic graph (DAG) executed by node devices in a peer-to-peer network, where the method includes:
  obtaining a data structure of a local database, where the data structure of the local database is established on the basis of the structured DAG;
  calculating a relative hashing power of each node device based on connection information between blocks in the structured DAG, where the connection information between the blocks include at least connection information between blocks created by each node device;
  partitioning the transactions in a local transaction pool according to the relative hashing power of each of the node devices, where the local transaction pool contains transactions which are to be processed and have not yet been hosted by the blocks;
  based on the partitioning result, selecting a first transaction, creating a first new block and establishing the connection(s) between the first new block and subsequent blocks in the structured DAG; removing the first transaction from the local transaction pool; and broadcasting the first new block to other node devices in the peer-to-peer network.

In an embodiment, the relative hashing power of one of the node devices is a fraction of the number of blocks created by the one node device within a preset time period to the total number of blocks created by all the node devices within the same preset time period.

In an embodiment, the partitioning of the transactions in the local transaction pool is according to the relative hashing power of each of the node devices is: If the following conditions are met, the node device i will create a new block containing a transaction $T_x$:

$$H(B_i.id, T_x) \leq cq_i$$

wherein $B_i$ represents the last block created and broadcasted to all of the node devices in the peer-to-peer network by the node device i;

$B_i$.id represents a unique identifier of Block $B_i$;

$H(B_i.id, T_x)$ represents hashing concatenation of $B_i$.id and $T_x$;

$q_i$ represents the relative hashing power of the node device i;

c represents an adjustable parameter determined by a preset transaction conflict index and a transaction queueing delay index.

In an embodiment, the present method further includes:

receiving a second new block created by a second or subsequent node device to the first node device;

determining whether there is/are any other transaction(s) in the local transaction pool that is/are identical to a second or subsequent transaction hosted in the second or subsequent new block; if so, removing the identical transaction(s) other than the second transaction from the local transaction pool.

In an embodiment, the connection information between the blocks further include: connection information between milestone blocks, and connection information between the milestone blocks and non-milestone blocks, where the milestone blocks are identified by: hashing information of the block to be identified and determining whether the hashing result meets the preset criteria for milestone difficulty; if so, the block to be identified is a milestone block; otherwise, it is a non-milestone block. Whether or not the transaction is accepted by all of the node devices is determined by the milestone block. More specifically, if there is a path from the latest milestone block to the block hosting the transaction, said transaction will be accepted by all of the node devices.

In an embodiment, the structured DAG includes at least a milestone chain connected by the milestone blocks and a peer chain connected by the blocks which are created by each of the node devices, where each block in the peer chain points to at least one of the milestone blocks.

In an embodiment, after broadcasting the first new block to other node devices in the peer-to-peer network, the method further includes:

determining value awarded to the node device creating the first new block, where the value awarded to the node device creating the first new block is determined by criteria including whether the first new block is valid, whether the first new block is a milestone block, and whether the first transaction is valid.

A second aspect of the present invention provides a corresponding transaction assignment apparatus based on structured directed acyclic graph (DAG) executed by node devices in a peer-to-peer network, where the apparatus includes:

an obtaining module;
a calculating module;
a partition module;
a block creation module; and
a distribution module,
wherein the obtaining module is configured to obtain a data structure of a local database, where the data structure of the local database is established based on the structured DAG;

the calculating module is configured to calculate a relative hashing power of each of the node devices based on connection information between blocks in the structured DAG, where the connection information between the blocks includes at least connection information between blocks created by each of the node devices;

the partition module is configured to partition transactions in the local transaction pool according to the relative hashing power of each of the node devices, where the local transaction pool includes the transactions which are to be processed and have not yet been hosted by the blocks;

the block creation module is configured to select a first transaction based on the result by the partition module, create a first new block and establish one or more connection(s) between the first new block and other blocks in the structured DAG, and remove the first transaction from the local transaction pool; and the distribution module is configured to broadcast the first new block to other node devices in the peer-to-peer network.

In an embodiment, the relative hashing power of one of the node devices is a fraction of the number of blocks created by the one node device within a preset time period to the total number of blocks created by all of the node devices within the same preset time period.

In an embodiment, the transactions in the local transaction pool are partitioned by the partition module: If the following conditions are met, the node device i will create a new block containing the transaction $T_x$:

$$H(B_i.id, T_x) \leq cq_i$$

wherein $B_i$ represents the last block created and broadcasted to all node devices in the peer-to-peer network by the node device i;

$B_i$.id represents the unique identifier of Block $B_i$; $H(B_i.id, T_x)$ represents hashing concatenation of $B_i$.id and $T_x$;

$q_i$ represents the relative hashing power of the node device i;

c represents an adjustable parameter determined by a preset transaction conflict index and a transaction queueing delay index.

In an embodiment, the apparatus further includes:

a receiving module, configured to receive a second or subsequent new block created by other node devices;

a maintenance module, configured to determine whether there is/are any transaction(s) in the local transaction pool that is/are identical to the second or subsequent transaction hosted in the second or subsequent new block; if so, the identical transaction(s) is/are removed from the local transaction pool.

In an embodiment, the connection information between the blocks further include: connection information between milestone blocks, and connection information between the milestone blocks and non-milestone blocks.

The apparatus further includes:

a block classification module, configured to hash the information of the block to be identified and determine whether the hashing result meets the preset criteria for milestone difficulty; if so, the block to be identified is a milestone block; otherwise, it is a non-milestone block;

a transaction determination module, configured to determine whether there is a path from the latest milestone block to the block hosting the transaction to be accepted; if so, that transaction is accepted by all of the node devices.

In an embodiment, the structured DAG includes at least a milestone chain connected by milestone blocks and a peer chain connected by blocks which are created by each of the node devices, where each block in the peer chain points to at least one of the milestone blocks.

In an embodiment, the apparatus further includes:

a reward calculation module, configured to determine value awarded to the node device creating the first new block after broadcasting the first new block to other node devices in the peer-to-peer network, where the value awarded to the node device creating the first new block is determined by criteria including: whether the first new block is valid, whether the first new block is a milestone block, and whether the first transaction is valid.

A third aspect of the present invention provides a transaction assignment apparatus based on structured directed acyclic graph (DAG) including a memory and a processor, where the memory is configured to store machine executable instructions; the processor is configured to read machine executable instructions from the memory, and execute them to perform the transaction assignment method as in the first aspect.

A fourth aspect of the present application provides a storage medium storing a program executed by a computing device to perform the transaction assignment method as in the first aspect.

Compared with the prior arts, the present invention has the following advantages: by the method of partitioning the transactions in the local transaction pool according to the relative hashing power of the node devices, the present application based on a structured directed acyclic graph (DAG), without any sacrifice of security and decentralization, does not only increase the chance of processing transactions with low fees or even no fees, but also effectively avoids wasting hashing power from processing transactions with high fees by multiple nodes.

BRIEF DESCRIPTION OF THE DRAWINGS

The drawings are only for the purpose of illustrating preferred embodiments, and are not intended to be limitations of the present application. Throughout the drawings, identical reference symbols are used to indicate identical components. In the drawings.

DETAILED DESCRIPTION

Initially, the objectives of the present invention will be explained in more detail as follows. To address the issues in the prior arts, i.e., the waste of hashing power from processing transactions with high fees by multiple nodes and almost no chance of processing transactions with low or no fees, the present invention applies a chain structure to the DAG with the use of PoW and partitions of transactions in a transaction pool by nodes, in order to solve the issue that identical transactions are processed by multiple nodes and provides the technical effect of increasing the chance of processing transactions with low or even no fees without any sacrifice of security and decentralization.

One of the objectives of the present invention is to "partition" all transactions in the transaction pool to each of the node devices according to corresponding identity and hashing power of each node provided by the peer chain in the DAG. When a transaction is associated with the latest block created by a node in the existing blocks, only if the hashing result of this transaction block meets certain criteria, e.g. the leading bits are 0, the node device will be able to process the transaction. In addition, node devices are allowed to create "empty" blocks without transaction and miners can earn a reward for creating blocks in the absence of any transaction fees. As such, the chance of processing the same transaction by multiple miners is effectively decreased, thereby the probability that multiple miners process the same transaction is substantially zero.

In order to comprehend the afore-mentioned objectives, features and advantages of the present invention, detailed description of preferred embodiments accompanied with drawings will be provided hereinafter.

The terms "first" and "second", as used in the descriptions of embodiments of the present application, are for descriptive purpose only and are not intended to indicate or imply relative importance, or to imply the quantity of the indicated technical features. Thus, features defined by "first" or "second" may include one or more of such features, either explicitly or implicitly. Unless otherwise specifically defined, "multiple" means two or more. The terms "comprising", "including" and other similar terms are to be construed as open language (i.e., meaning "comprising/including, but not limited to"). The term "based on" refers to "based at least in part on". The term "an embodiment" means "at least one embodiment"; The term "another embodiment" means "at least one additional embodiment". The relevant definitions of other terms will be given in the following descriptions.

Figure 1:
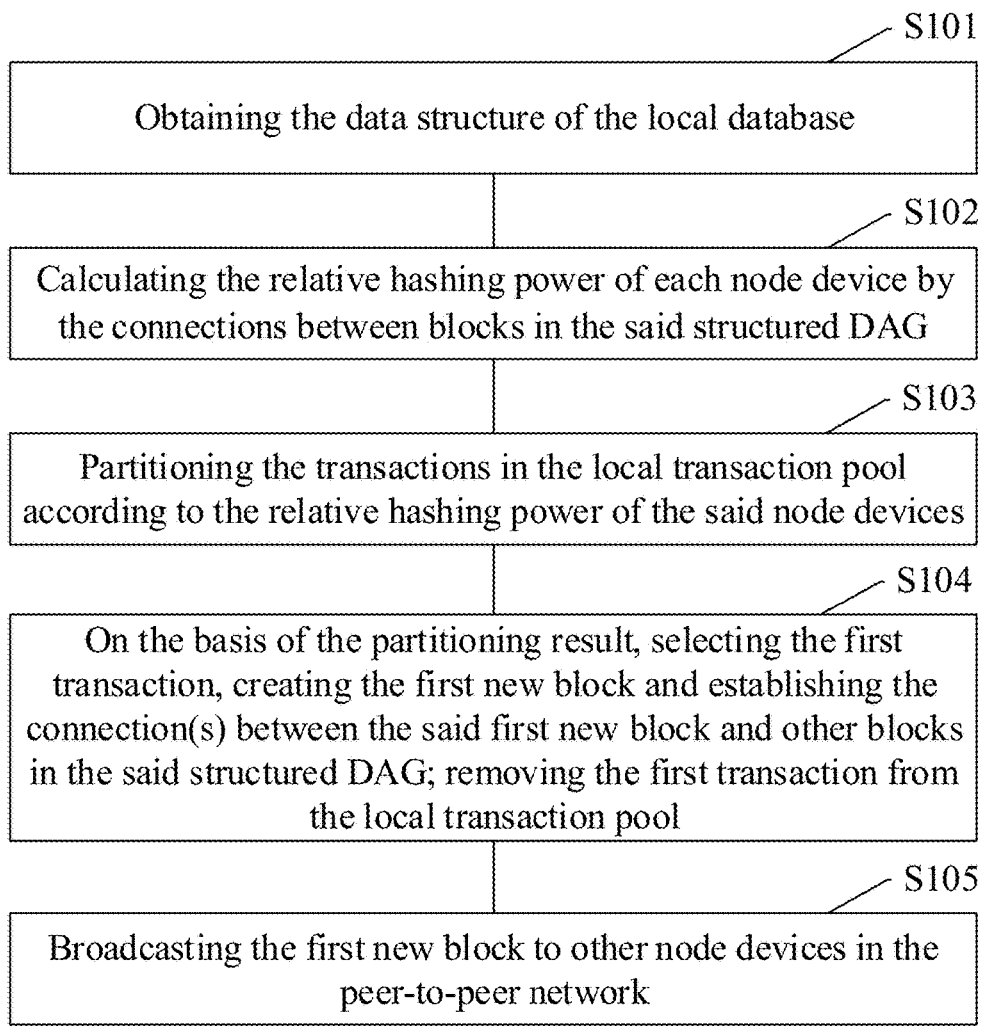
FIG. 1 is a flow diagram of a transaction assignment method based on a structured DAG according to the first embodiment of the present invention.

FIG. 1 illustrates as a flowchart the present transaction assignment method based on a structured DAG according to a first embodiment of the present invention. Subject executing the present method is one or more node devices in a peer-to-peer network, and each node device is configured with local database and local transaction pool. In a preferred embodiment, the present method includes:

S101: obtaining a data structure of the local database, wherein the data structure of the local database is established on the basis of the structured DAG;

S102: using the structured DAG including connection information between blocks to calculating a relative hashing power of each of the node devices, wherein the connection information between the blocks includes at least connection information between the blocks created by each of the node devices;

The connection information between the blocks created by each of the node devices thereby constitutes the peer chain in the structured DAG.

In a specific embodiment, the relative hashing power of one of the node devices can be a fraction of the number of blocks created by the one node device within a preset time period to the total number of blocks created by all of the node devices within the same preset time period, or other similar values.

S103: partitioning transactions in the local transaction pool according to the relative hashing power of each of the node devices, wherein the local transaction pool contains the transactions which are to be processed and have not yet been hosted by the blocks;

To further improve the performance of the present invention, memory cache is preferably selected to form the local transaction pool.

S104: based on the partitioning result, selecting a first transaction, creating a first new block and establishing connection(s) between the first new block and other blocks in the structured DAG; and removing the first transaction from the local transaction pool.

In a specific embodiment, the connections between different blocks characterized by the structured DAG in the present invention can be formed by information of new blocks created by each of the node devices. In this regard, the information of the first new block includes at least transaction message selected from the local transaction pool and pointer information of the first new block pointing to other blocks, wherein the above-mentioned peer chain can be formed by pointer ($id_{prev}$) in each of the new blocks which points to the blocks recently broadcasted by the present node device. When the present node device creates a new block for the first time, the above-mentioned pointer may directly point to a genesis block.

And,

S105: broadcasting the first new block to other node devices in the peer-to-peer network.

In a further preferred embodiment, the present method further includes the followings for processing blocks received from other devices:

S106: receiving a second new block created by other node devices.

S107: determining whether there is/are any transaction(s) in the local transaction pool that is/are identical to a second transaction hosted in the second new block; if so, switching to step S108; otherwise, the method ends.

S108: removing identical transaction(s) from the local transaction pool.

In a specific embodiment, the partitioning of the transactions in the local transaction pool according to the relative hashing power of the node devices is that if the following conditions are met, the node device i will create a new block containing the transaction $T_x$:

$$H(B_i.id, T_x) \leq cq_i$$

wherein $B_i$ represents the last block created and broadcasted by the node device i;

$B_i.id$ represents the unique identifier of Block $B_i$;

$H(B_i.id, T_x)$ represents hashing concatenation of $B_i.id$ and $T_x$;

$q_i$ represents relative hashing power of the node device i;

c represents an adjustable parameter determined by a preset transaction conflict index and a transaction queueing delay index.

This means that any transaction $T_x$ with the probability of $cq_i \wedge 1$ is workable for node device i. Therefore, on average, each transaction $T_x$ is workable for c nodes at the same time. If $cq_i \geq 1$, the probability that $T_x$ is not workable for any node is 0; otherwise, the probability that $T_x$ is not workable for any node is:

$$\prod_{i=1}^{n}(1-cq_i) \leq \left(\frac{\sum_{i=1}^{n}(1-cq_i)}{n}\right)^n = \left(1-\frac{c}{n}\right)^n \approx e^{-c}.$$

Note that, a set of workable transactions for each node is dynamic as it will change when the node creates a new block. Therefore, the probability that $T_x$ is not workable for any node decays exponentially.

To facilitate understanding, the beneficial technical effects of some preferred embodiments of the present invention are illustrated hereinafter by ways of examples that there is a total of n miners and each of them has equal hashing power.

Initially, the following example shows that the preferred embodiments of the present invention can effectively reduce the probability that identical transaction(s) is/are processed by multiple nodes: assuming that new blocks are created by a single node at a rate of $\mu$, thus the total arrival rate of blocks is $n\mu$; assuming that a transaction $T_x$ has been mined by a node at time 0, $N_i$ denotes the number of blocks mined by node device i during time $[0, t_i]$, wherein $t_i$ is the time when node device i receives the block and $t_i$ satisfies $\mathbb{P}(t_i \leq t) = F(t)$. Thus, $N_i \sim Poi(\mu t_i)$. $\mathbb{I}_i$ indicates whether or not node device i has ever been eligible to mine $T_x$ during time $[0, t_i]$, thus with respect to $N_i$, $\mathbb{I}_i \sim Ber((1-(1-c/n)^{N_i}))$. Even if node device i has a chance to mine $T_x$, it also needs an $Exp(\mu)$ time to complete the mining. Let $A_i$ be the event where "node device i successfully mines $T_x$ again before it receives the block broadcasted at time 0", there is provided:

$$\mathbb{P}(A_i \mid t_i, \mathbb{I}_i) \leq 1 - e^{-\mathbb{I}_i \mu t_i}$$

and, $$\mathbb{P}(A_i) \leq \mathbb{E}(1-e^{-\mu t_i})\left(1-e^{-\frac{c}{n}\mu t_i}\right) \leq \left(1-e^{-\mu \bar{t}}\right)\left(1-e^{-\mu \bar{t}\frac{c}{n}}\right),$$

wherein $\bar{t} = \mathbb{E}t_i = \int t dF(t)$, and the last inequality is obtained by Jenson's inequality.

Therefore, as $n \to \infty$, the lower limit of probability that $T_x$ is mined exactly once is defined as:

$$\prod_{i=1}^{n}(1-\mathbb{P}(A_i)) \geq \left(e^{-\frac{c}{n}\mu \bar{t}}\left(1-e^{-\mu \bar{t}}\right) + e^{-\mu \bar{t}}\right)^n \to e^{-c\mu \bar{t}(1-e\mu_- t)}$$

And the upper limit of an expected number of copies of mined $T_x$ is defined as:

$$\sum_{i=1}^{n}\mathbb{P}(A_i) \leq \left(1-e^{-\mu \bar{t}}\right)n\left(1-e^{-\mu \bar{t}\frac{c}{n}}\right) \to \left(1-e^{-\mu \bar{t}}\right)\mu c \bar{t}.$$

Therefore, the lower limit of a ratio of the number of different transactions in the blocks to the total number of blocks containing transactions is defined as:

$$\theta = \frac{1}{1+(1-e^{-\mu \bar{t}})\mu c \bar{t}}.$$

Subsequently, how to define queueing latency of a transaction in the transaction pool will be provided. Based on the assumption that new transactions arrive at the system with a constant rate $\lambda$, and Q denotes the queue length.

Whenever a peer tries to find a transaction from the transaction pool to work on, the number of available transactions follows the binomial distribution with parameter (Q,c/n), which can be approximated by the Poisson Distribution with rate (Qc/n). Thus, a proportion of time that a node device has to work on an empty block is $e^{-Qc/n}$. In the blocks containing transactions, only proportion $\theta$ of the transactions are different from each other. The total service rate for transactions is defined as $\theta n\mu(1-e^{-Qc/n})$. For the system to have a stable Q, it is required that:

$$n\mu(1-e^{-Qc/n})\theta=\lambda,$$

and $$Q = \frac{n}{c}\ln\left(\frac{n\mu}{n\mu - \lambda/\theta}\right)$$

is provided. By Little's law, an average waiting time of a transaction is defined as $$W = \frac{n}{c\lambda}\ln\left(\frac{n\mu}{n\mu - \frac{\lambda}{\theta}}\right).$$

In view of a more general situation where the arrival rate of new transactions is time-variant, it is denoted by $\lambda(t)$. In order to maintain the size of queue length Q(t) to be time-invariant, the creation rate of blocks, $\mu(t)$, needs to be controlled by dynamically adjusting the difficulty level of the puzzle, in order to obtain the following differential equation:

$$\frac{dQ(t)}{dt} = \lambda(t) - n\mu(t)(1 - e^{-Q(t)c/n})\theta.$$

If $\lambda(t)$ can be accurately approximated, then $$\mu(t) - \frac{\lambda(t)}{n(1 - e^{-Q(t)c/n})\theta}$$

could be chosen to make the queue size stable.

Figure 2:
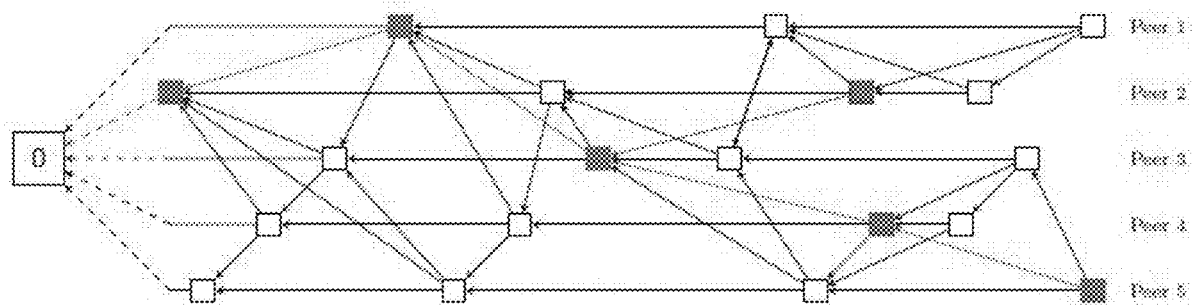
FIG. 2 is a schematic diagram of a structured DAG according to an embodiment of the present invention.

In a further preferred embodiment of the present method, in order to ensure the implementation of the present method is safe, the relatively more difficult blocks, referred herein as milestone blocks, are interspersed in the structured DAG, and a milestone chain, also called the Nakamoto chain, is also formed based on connections between milestone blocks. As shown in FIG. 2, the structured DAG according to embodiments of the present invention starts from a genesis block containing trusted information, where a large hollow block represents genesis block o; a small hollow block represents non-milestone block; line segment with an arrow represents connections between blocks. It should be noted that, for ease of description, the structured DAG shown in FIG. 2 is represented by five nodes as an example. Those skilled in the art can adjust the number of nodes according to any specific requirements.

As described herein, determination of the milestone block includes: hashing information of the block to be identified and determining whether the hashing result meets the preset criteria for milestone difficulty; if so, the block to be identified is a milestone block; otherwise, it is a non-milestone block.

It can be seen that whether or not the block in the present invention is a milestone block is only determined by the mining node when the mining process is finished. It is somehow determined by chance to certain extent since the workflow of creating any blocks is the same. Such design not only expands capacity, but also ensures that the milestone chain is completely decentralized. In order to demonstrate the role of hashing power of node devices in determining milestone blocks, each node device can add its own identity information to the block when creating a new block, but hashing power cannot constitute the decisive factor of milestone blocks.

Whether or not the transaction hosted in the block (including milestone block and non-milestone block) is accepted by all node devices is determined by the milestone block, and more specifically, it is determined by: if there is a path from the latest milestone block to the block hosting the said transaction, the corresponding transaction is accepted by all the node devices; however, if there is no such path, the corresponding transaction will not be accepted by all the node devices.

As shown in FIG. 2, taking the transactions in the last block created by node device 4 and the transaction in the last block created by node device 2 as an example: since there is a path from the latest milestone block created by node device 5 to the last block created by node device 4 (the latest milestone block created by node device 5→the last block created by node device 3→the last block created by node device 4), all the node devices will accept the transaction which is hosted in the last block created by node device 4; and there is no path from the latest milestone block created by node device 5 to the last block created by node device 2, so the transaction which is hosted by the last block created by node device 2 will not be accepted by all the node devices.

To ensure the presence of the above paths for validity determination of transactions, when each node device creates a new block, the information of the new block should also include a pointer ($id_{ms}$) which points to the milestone block; $id_{ms}$ can point to the genesis block when there is no milestone block in the structured DAG.

In order to further shorten the determination latency of transactions and to increase the throughput thereof, connectivity of the structured DAG can be enhanced. In a specific embodiment, a pointer ($id_{nps}$) can be added for pointing to the block created by other nodes in the process of creating a new block, preferably is a pointer which points to the non-milestone block newly broadcasted by other nodes; $id_{nps}$ can point to the genesis block when there is no non-milestone block created by other nodes in the structured DAG.

In another preferred embodiment of the present method, a reward mechanism is also provided for the node device to create a new block, so as to encourage miners to create blocks containing transactions with low or no fees, in order to further increase the chance of processing transactions with low or no fees and to reduce the probability of repeatedly processing transactions with high fees. After S105, the present method further includes:

S109: determining value awarded to the node device creating the first new block, wherein criteria determining the value awarded include: whether the first new block is valid, whether the first new block is a milestone block, and whether the first transaction is valid, etc.

For example, for a non-milestone block mined by a miner, 98% of the sum of dynamic reward and transaction fees can be obtained if the non-milestone block and the transaction carried therewith are both valid; if only the non-milestone block is valid but the transaction carried therewith is invalid, only 98% of the dynamic reward is obtained. If a miner mines a milestone block, a fixed reward plus the transaction fees can be obtained, as well as an additional 2% of the reward for all the blocks that the milestone block determines. The milestone block that loses in a fork competition can be treated as a non-milestone block. The fixed reward for this block is tuned to be dynamic reward so that the total rewards distributed to non-milestone blocks per unit time is fixed.

For simplicity of explanation, the aforementioned embodiments of the present method are illustrated and described as a combination of a series of actions. Nevertheless, those skilled in the art should understand that embodiments of the present invention are not limited by the described action sequence, as some steps may be performed in other sequences or be performed concurrently in the embodiments of the present invention; moreover, those skilled in the art should know that the above-mentioned embodiments of the present method are all preferred embodiments, and that the actions and modules involved are not necessarily essential in the embodiments of the present invention.

The embodiments of the present invention also provide a storage medium which stores a program to perform the aforementioned method. The storage medium includes any mechanisms configured to store or transmit information in a computer-readable form (take computer as an example), e.g., storage medium including ROM, RAM, disk storage medium, optical storage media, flash storage media, electricity, light, sound or other forms of the propagation signal (carrier wave, infrared signal, digital signal, etc.) and so on.

Figure 3:
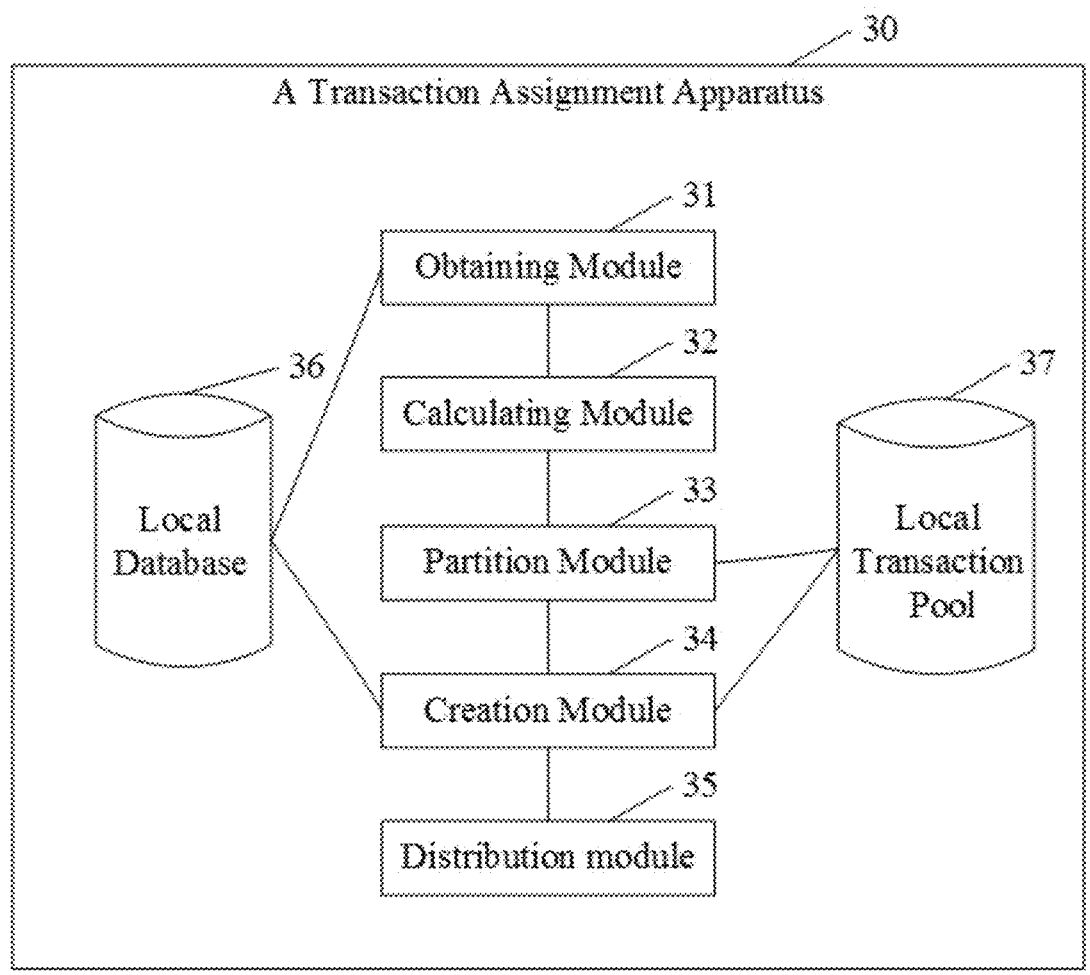
FIG. 3 is a structure diagram of a transaction assignment apparatus based on a structured DAG according to a second embodiment of the present invention.

FIG. 3 is a structure diagram showing a transaction assignment apparatus based on a structured DAG of the second embodiment of the present invention. A transaction assignment apparatus 30, which is executed by node devices in a peer-to-peer network, includes: an obtaining module 31, a calculating module 32, a partition module 33, a creation module 34, and a distribution module 35, wherein:

the obtaining module 31 is configured to obtain the data structure of the local database 36;

the data structure of the local database is established on the basis of structured DAG;

the calculating module 32 is configured to calculate relative hashing power of each of the node devices based on connection information between blocks in the structured DAG, where the connection information between the blocks includes at least connection information between the blocks created by each of the node devices;

the partition module 33 is configured to partition transactions in the local transaction pool 37 according to the relative hashing power of each of the node devices, where the local transaction pool contains the transactions which are to be processed and have not yet been hosted by the blocks. In a specific embodiment, the relative hashing power of one of the node devices can be a fraction of the number of blocks created by the one node device within a preset time period to the total number of blocks created by all of the node devices within the same preset time period, or other similar values;

the creation module 34 is configured to select a first transaction on the basis of the partitioning result, create a first new block and establish connection(s) between the first new block and other subsequent blocks in the structured DAG, and remove the first transaction from the local transaction pool 37. In a specific embodiment, to further improve the performance of the present invention, memory cache is preferably selected to form the local transaction pool 37;

the distribution module 35 is configured to broadcast the said first new block to other node devices in the peer-to-peer network. In a preferred embodiment of the present apparatus, the distribution module can partition the transactions in the local transaction pool as follows: If the following conditions are met, the node device i will create a new block containing the transaction $T_x$:

$$H(B_i.id, T_x) \leq cq_i$$

wherein, $B_i$ represents the last block which has already been broadcasted by the node device i;

$B_i.id$ represents the unique identifier of Block $B_i$;

$H(B_i.id, T_x)$ represents hashing concatenation of $B_i.id$ and $T_x$;

$q_i$ represents the relative hashing power of the node device i;

c represents an adjustable parameter determined by the preset transaction conflict index and the transaction queueing delay index.

In another preferred embodiment of the present invention, the present apparatus further includes: a receiving module configured to receive a second or subsequent new block created by other node devices; a maintenance module configured to determine whether there is/are any transaction(s) in the local transaction pool that are identical to a second or subsequent transaction hosted in the second or subsequent new block; if so, the identical transaction(s) will be removed from the local transaction pool.

As described herein, the connection information between the blocks further includes: connection information between milestone blocks, and connection information between the milestone blocks and non-milestone blocks; accordingly, the present apparatus can further include: a block classification module configured to hash the information of the block to be identified and determine whether the hashing result meets the preset criteria for milestone difficulty; if so, the block to be identified is a milestone block; otherwise, it is a non-milestone block; a transaction determination module configured to determine whether there is a path from the latest milestone block to the block hosting the transaction to be accepted; and if so, that transaction is accepted by all the node devices.

In a specific embodiment, the structured DAG includes at least a milestone chain connected by the milestone blocks and a peer chain connected by the blocks which are created by each of the node devices; each block in the peer chain points to at least one of the milestone blocks.

In addition, the present apparatus can further include: a reward calculation module configured to determine value awarded to each of the node devices creating the first new block after the distribution module 35 broadcasts the first new block to other node devices in the peer-to-peer network, where criteria determining the value awarded to each of the node devices creating the first new block include: whether the said first new block is valid, whether the type of the first new block is a milestone block, and whether the said first transaction is valid, etc.

Figure 4:
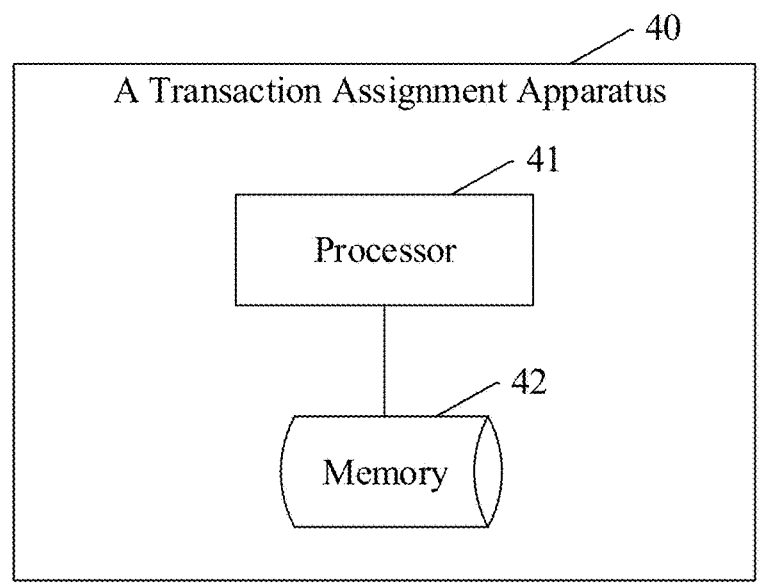
FIG. 4 is a structure diagram of a transaction assignment apparatus based on a structured DAG according to a third embodiment of the present invention.

FIG. 4 is a schematic diagram depicting the structure of a transaction assignment apparatus based on a structured DAG according to the third embodiment of the present invention. The transaction assignment apparatus 40, which is executed by node devices in a peer-to-peer network, includes at least a memory 42 and a processor 41, where the memory 42 is configured to store machine executable instructions; the processor 41 is configured to read the machine executable instructions from the memory, and execute the machine executable instructions to perform the transaction assignment method according to the first embodiment of the present invention.

It should be noted that the aforementioned embodiments of the apparatus are preferred embodiments, and that the units and modules involved are not necessarily essential in the present invention.

Embodiments in the present invention are described in a progressive manner, and each embodiment is provided mainly according to its difference(s) from other embodiments. The same and similar parts between different embodiments can be referenced to each other. Among the embodiments of the present invention, because the present apparatus may share some similarities with the present method, some of the embodiments of the present apparatus may therefore be described in a rather simple way, while other relevant parts can take reference to the descriptions of the embodiments of the present method. The apparatus and embodiments thereof described herein are merely illustrative, and the modules which are described herein as separate components may or may not be physically separated, that is, they may be disposed in the same location or distributed over multiple network elements. Some or all of the modules described herein can be selected according to actual needs in order to achieve the objectives of the present invention according to various embodiments as described. Those of ordinary skill in the art can understand and implement the embodiments without any undue experimentation. The embodiments are chosen and described in order to best explain the principles of the invention and its practical applications, thereby enabling others skilled in the art to understand the invention for various embodiments and with various modifications that are suited to the particular use contemplated. It is intended that the scope of the invention be defined by the following claims and their equivalence.

The invention claimed is:

1. A method for assigning transactions based on a structured directed acyclic graph executed by node devices in a peer-to-peer network, comprising:
    obtaining a data structure of a local database, the data structure of the local database being established based on the structured DAG;
    calculating a relative hashing power of each of the node devices based on connection information between blocks in the structured DAG, the connection information between the blocks comprising at least the connection information between the blocks created by each of the node devices;
    partitioning the transactions in the local transaction pool according to the relative hashing power of each of the node devices, the local transaction pool containing the transactions to be processed and not having been hosted by any of the blocks yet;
    based on the partitioning result, selecting a first transaction, creating a first new block, establishing one or more connections between a first new block and other subsequent blocks in the structured DAG, and removing the first transaction from the local transaction pool; and
    broadcasting the first new block to other node devices in the peer-to-peer network;
    wherein the relative hashing power of one of the node devices is a fraction of the number of blocks created by the one node device within a preset time period to the total number of blocks created by all of the node devices within said preset time period; and
    wherein the partitioning of the transactions in the local transaction pool according to the relative hashing power of each of the node devices is:
        if the following conditions are met, the node device i will create a new block containing the transaction Tx:

$$H(Bi.id, Tx) \leq cg_i;$$

wherein Bi represents a last block created and broadcasted to all of the node devices in the peer-to-peer network by said node device i,
    Bi.id represents a unique identifier of Block Bi,
    H(Bi.id, Tx) represents hashing concatenation of Bi.id and Tx,
    $g_i$ represents the relative hashing power of the node device i, and
    c represents an adjustable parameter determined by a preset transaction conflict index and a transaction queueing delay index.

2. The method of claim 1, further comprising:
    receiving a second or subsequent new block created by node devices other than the node device creating the first new block;
    determining whether there is/are any transactions in the local transaction pool that is/are identical to a second transaction hosted in the second new block,
    if the transaction(s) in the local transaction pool that is/are identical to a second transaction hosted in the second new block, removing the identical transaction(s) from the local transaction pool.

3. The method of claim 1, wherein the connection information between the blocks further comprises:
    connection information between milestone blocks; and
    connection information between the milestone blocks and non-milestone blocks,
    wherein the milestone block is identified by: hashing information of the block to be identified and determining whether the hashing result meet preset criteria for milestone difficulty; if so, the block to be identified is a milestone block; otherwise, the block is a non-milestone block, and
    wherein the milestone block determines whether a transaction is accepted by all the node devices if there is a path from the latest milestone block to the block hosting the transaction.

4. The method of claim 3, wherein the structured DAG comprises at least a milestone chain composed of the milestone blocks being connected together and a peer chain composed of the blocks being connected together and created by each of node devices, and each block in the peer chain points to at least one of the milestone blocks.

5. The method of claim 3, after broadcasting the first new block to other node devices in the peer-to-peer blockchain network, further comprising:
    determining value awarded to the node device creating the first new block, wherein criteria of said determining the value awarded to the node device creating the first new block include:
whether the first new block is valid;
whether the first new block is a milestone block; and
whether the first transaction is valid.

6. An apparatus for assigning transaction based on structured digital acyclic graph (DAG) executed by node devices in a peer-to-peer network comprising:
an obtaining module;
a calculating module;
a partition module;
a creation module; and
a distribution module,
wherein the obtaining module is configured to obtain a data structure of a local database established based on the structured DAG;
the calculating module is configured to calculate relative hashing power of each of the node devices based on connection information between blocks in the structured DAG, wherein the connection information between the blocks comprises at least connection information between the blocks created by each of the node devices;
the partition module is configured to partition the transactions in the local transaction pool according to the relative hashing power of the node devices, wherein the local transaction pool contains transactions to be processed and not having been hosted by any of the blocks yet;
the creation module is configured to select a first transaction based on the partitioning result, create a first new block, establish one or more connection(s) between the first new block and other subsequent blocks in the structured DAG, and remove the first transaction from the local transaction pool;
the distribution module is configured to broadcast the first new block to other node devices in the peer-to-peer network;
wherein the relative hashing power of one of the node devices is a fraction of the number of blocks created by the one node device within a preset time period to the total number of blocks created by all the node devices within said preset time period; and
wherein partitioning of the transactions in the local transaction pool by the partition module is:
if the following conditions are met, the node device i will create a new block containing the transaction Tx:

$H(Bi.id, Tx) \leq cq_i;$ wherein Bi represents a last block created and broadcasted to all the node devices in the peer-to peer network by the node device i,
Bi.id represents a unique identifier of Block Bi,
H(Bi.id, Tx) represents hashing concatenation of Bi.id and Tx,
gi represents a relative hashing power of the node device i,
c represents an adjustable parameter determined by a preset transaction conflict index and a transaction queueing delay index.

7. The apparatus of claim 6, further comprising:
a receiving module configured to receive a second or subsequent new block created by node devices other than the node device creating the first new block;
a maintenance module configured to determine whether there is/are any transactions in the local transaction pool that are identical to a second transaction hosted in said second new block,
wherein if there is/are any transactions in the local transaction pool that are identical to the second transaction hosted in said second new block, said transactions will be removed from the local transaction pool.

8. The apparatus of claim 6, wherein the connection information between the blocks further comprises:
connection information between milestone blocks; and
connection information between the milestone blocks and non-milestone blocks.

9. The apparatus of claim 8, further comprising:
a block classification module configured to hash information of the block to be identified and determine whether the hashing result meets preset criteria for milestone difficulty; if so, the block to be identified is a milestone block; otherwise, it is a non-milestone block;
a transaction determination module configured to determine whether there is a path from the latest milestone block to the block hosting the transaction to be accepted; if so, said transaction is accepted by all the node devices.

10. The apparatus of claim 8, wherein the said structured DAG comprises at least a milestone chain composed of milestone blocks being connected together and a peer chain composed of the blocks being connected together and created by each of the node devices; and each of the blocks in the peer chain points to at least one of the milestone blocks.

11. The apparatus of claim 8, further comprising:
a reward calculation module configured to determine value awarded to each of the node devices creating a first new block after broadcasting the first new block to other node devices in the peer-to-peer blockchain network,
wherein criteria determining value awarded to the node device creating the first new block include:
whether the first new block is valid;
whether the first new block is a milestone block; and
whether the said first transaction is valid.

12. An apparatus for assigning transactions based on a structured DAG executed by node devices in a peer-to-peer network, comprising
at least a memory; and a processor;
wherein the memory is configured to store machine executable instructions;
the processor is configured to read the machine executable instructions from the memory, and execute the machine executable instructions to perform the method of claim 1.

13. A storage medium with a program executed by a computing device to perform the method of claim 1.

* * * * *